Figure 1:
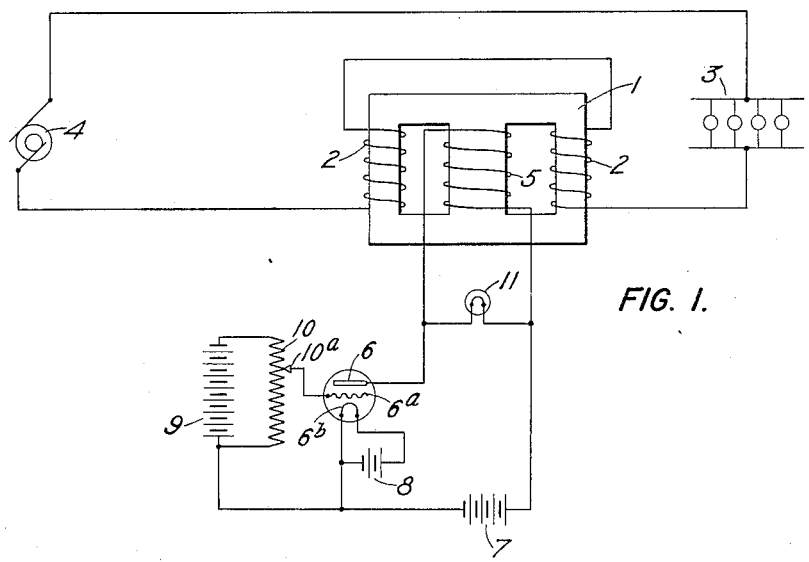

Jan. 1, 1935.    F. G. LOGAN    1,986,112
ELECTRIC CONTROLLING APPARATUS

Filed May 11, 1933

INVENTOR
Frank G. Logan
BY Lawrence K. Sager
his ATTORNEY

Patented Jan. 1, 1935

1,986,112

UNITED STATES PATENT OFFICE 1,986,112

ELECTRIC CONTROLLING APPARATUS

Frank G. Logan, Mount Vernon, N. Y., assignor to Ward Leonard Electric Company, a corporation of New York Application May 11, 1933, Serial No. 670,425

10 Claims. (Cl. 171—242)

This invention relates particularly to the control of current or voltage to which a translating device is subjected and particularly when a reactor is used in an alternating current circuit. A particular application is when a reactor core is wound with one or more coils in series with the load or translating device and the core is provided with a direct current exciting winding. Change of current in this exciting winding will change the flux of the core and thus vary the reactance of the alternating current windings from a low to a high value and thereby vary the voltage applied to the load and the load current. Such reactors are commonly used for the control of lamp loads, as in theatres and the like, from full brilliancy of the lamps to a low value for the different scenes. When the direct exciting current has a high value, the core is saturated and the reactance of the alternating current coils is low. Nearly the full line voltage is then applied to the load and in case of a lamp load, the lamps are at their maximum brilliancy. When the direct exciting current is brought to a low value, the reactance of the alternating current coils is permitted to increase and under the increased counter-electromotive force, the voltage and current of the load are reduced, giving a low lighting effect in the case of a lamp load.

With the usual methods of controlling the direct current excitation, as by a rheostat in series with the direct current winding, or by a controlling tube system, the minimum direct current excitation cannot economically be made sufficiently low to permit a desired high reactance of the alternating current coils and sufficiently low current in the load circuit. In the case of using a rheostat, it is undesirable to break the circuit and consequently a small exciting current passes even with the full resistance in series with the direct current winding. In the case of control by a vacuum tube system, the inherent character of this type of control prevents the attainment of direct current having a very low value. Furthermore, an operator, when the lamp load is at a distance, is not readily informed by a proper indicator, of the condition of the load current when using apparatus of the above character.

The main object of the present invention is to provide means which will automatically permit the exciting current of the reactor to be reduced to a very low value when using controlling apparatus of the types under consideration, and to accomplish this by the addition of a device which is efficient in its operation, simple in character, low in cost and dependable in operation. Another object is to apply this controlling means in such a way that it is readily and conveniently applicable to various types of control and to reactors when utilized for various purposes. Another object is to provide a form of automatic controlling means which will also serve as an indicator to the operator and plainly show him at all times the condition of the load current or voltage. Other objects and advantages of this invention will be understood by those skilled in the art from the following description and accompanying drawing.

Figure 2:
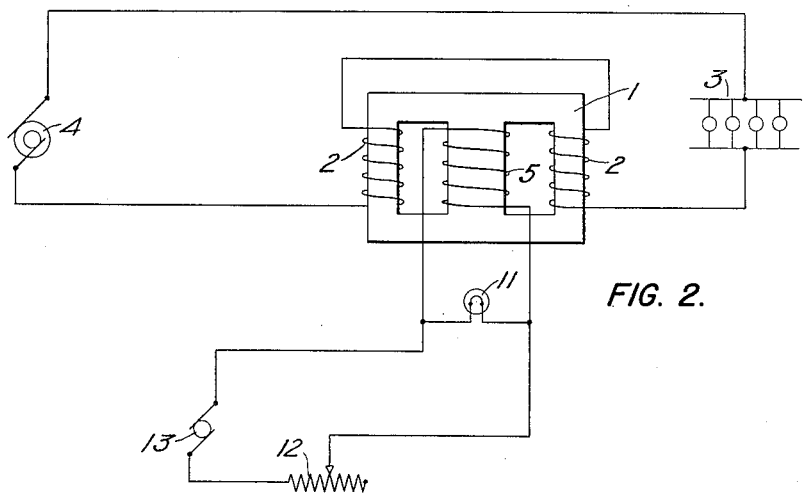

Figure 1 is a diagram illustrating one embodiment of this invention wherein a tube controlling system is used for control of the direct current excitation of the reactor; and Fig. 2 is a similar diagram wherein a rheostat is used for control of the direct current excitation.

Referring to Fig. 1, a three-legged reactor is shown having a core 1 and in which the three legs carrying the windings, are connected by end pieces. The core may, however, be of any particular form desired laminated in the usual way and the windings variously arranged. On the two outside legs of the core are, in the form shown, located the alternating current windings 2 indicated in series with each other and with the load 3, the source of alternating energy being indicated at 4. The direct current exciting winding 5 is shown on the middle leg of the core.

The change of voltage and current supplied to the direct current winding 5 is controlled by a three element vacuum tube having a plate 6, grid 6ª and filament 6ᵇ. An energy supplying battery 7 is connected in series with the winding 5 in the plate circuit of the tube. The filament battery is shown at 8. The grid potential battery 9 has a potentiometer 10 connected across its terminals. The adjustable contact 10ª of the potentiometer is connected to the grid of the tube. Change of adjustment of the contact 10ª changes the grid potential and thereby varies the current in the winding 5 as desired. When the contact 10ª is adjusted towards the negative terminal of the battery 9 to give a reduced current in winding 5, there is a point at which the current in winding 5 will be reduced to a minimum beyond which this current cannot be readily reduced. This minimum current is of sufficient value to materially limit the increase of the reactance of the reactor and results in the load not receiving the desired minimum voltage and minimum current, particularly in the case of a lamp load when full black out of the lamps may be desired.

Across the terminals of the winding 5 is shown a shunting element 11. This is an element or resistance which has a positive temperature coefficient of considerable amount such as a resistance of iron, nickel, tungsten and the like. Of these and other high temperature positive coefficient metals and alloys, tungsten is particularly desirable especially when used as in the usual tungsten incandescent lamp. Its increase in resistance from atmospheric temperature to that of full incandescence is as much as sixteen times or more. It is particularly well adapted for use as the element 11, which is indicated as an incandescent lamp having a tungsten filament.

In operation, when the contact 10ª is adjusted to give maximum current to the winding 5, the lamp 11 will then receive its full voltage for full incandescence and shunt very little current from the winding 5 owing to its then high resistance. This slight shunting current will not be of sufficient amount to objectionably affect the desired saturation, or approach to saturation, of the reactor core. When the grid potential is adjusted to reduce the current in winding 5 to minimum value, the voltage applied to element 11, or the tungsten lamp when so used, is correspondingly reduced and its temperature falls resulting in a large decrease in its resistance. Thus element 11 will then offer a path of relatively low shunt resistance to the winding 5 and shunt a considerable portion of the plate current from the winding 5, permitting the current in winding 5 to be reduced to a value much less than could result without the low shunting resistance 11. The voltage applied to the load 3 and the resulting load current will be correspondingly less. Thus the automatically variable resistance or impedance means 11 serves to act automatically in increasing the range of control of the voltage and current of the load in a highly advantageous manner over that obtainable without the automatically acting variable resistance shunting device and give a considerably lower voltage and current to the load than is obtainable without the use of the device 11.

Moreover, the device 11 when in the form of a tungsten lamp, or other visibly changing means, serves as an indicator to show the condition of the load voltage and current. Thus when the load is receiving maximum voltage and current and in the case of a lamp load when the lamps are at full brilliancy, the tungsten lamp 11 will also be at full brilliancy. When the load is receiving minimum voltage and current, the lamp 11 will also be receiving its minimum voltage and be at or near black out. This function of the device 11 of serving as an indicator in harmony with the condition of the load, is particularly desirable as the load is frequently remote from the operator and device 11 and this device thus reports directly to the operator the load condition, as well as giving a check on the proper functioning of the apparatus.

In Fig. 2 the parts similarly numbered correspond to those of Fig. 1. In Fig. 2 an adjustable resistance or rheostat 12 is indicated in series with the winding 5 and with a direct current source 13, the rheostat serving as the means for changing the current in the winding 5 as desired. As it is ordinarily undesirable to open the circuit of the rheostat or adjustable resistance 12 after the full amount of the resistance is inserted, the device 11 will function as already described to very considerably reduce the current in winding 5 beyond that obtainable without the use of the device 11 and may also serve as a visible indicator of the condition of the load.

Although I have described particular applications of the invention, it will be understood that the same is applicable to various other embodiments and to various different forms of apparatus.

I claim:

1. The combination with a reactive device, of a controlling winding having a changeable current, and means for automatically shunting a considerable portion of the current from said winding when the value of the current supplied to the circuit of said winding is low and for shunting only a small portion of the current from said winding when the current supplied to the circuit of said winding is comparatively high.

2. The combination of a reactor core, an alternating current winding thereon, a controlling winding thereon for affecting the flux density thereof for affecting the reactance of said alternating current winding, and means for automatically shunting a considerable portion of the current from said controlling winding when the value of the current supplied to the circuit of said controlling winding is low and for shunting only a small portion of the current from said controlling winding when the current supplied to the circuit of said controlling winding is comparatively high.

3. The combination of a reactor core, an alternating current winding thereon, a direct current winding thereon, adjustable means for varying the current supplied to said direct current winding, and means for automatically shunting a considerable portion of the current from said direct current winding when the current supplied to the circuit of said direct current winding is low and for shunting only a small portion of the current from said direct current winding when the current supplied to the circuit of said direct current winding is comparatively high.

4. The combination of a reactor core, an alternating current winding thereon, a direct current winding thereon, adjustable means for varying the current supplied to said direct current winding, and a device connected in shunt to said direct current winding, said device having a comparatively high positive temperature co-efficient.

5. The combination of a reactor core, an alternating current winding thereon adapted to be connected in series with the load, a direct current winding thereon for adjusting the flux density of the core to different values, and a resistance connected in shunt to said direct current winding, said resistance having a comparatively high positive temperature co-efficient.

6. The combination of a reactor core, an alternating current winding thereon adapted to be connected in series with the load, a direct current winding thereon for adjusting the flux density of the core to different values, a lamp connected in shunt to said direct current winding, said lamp having a comparatively high temperature co-efficient.

7. The combination of a reactor core, an alternating current winding thereon adapted to be connected in series with the load, a direct current winding thereon for adjusting the flux density of the core to different values, and a tungsten lamp connected in shunt to said direct current winding.

8. The combination of a reactor core, an alternating current winding thereon adapted to be connected in series with the load, a direct current winding thereon for adjusting the flux density of the core to different values, and means for automatically shunting an increasing proportion of the current from said direct current winding as the voltage applied thereto is decreased.

9. The combination of a reactor core, an alternating current winding thereon adapted to be connected in series with the load, a direct current winding thereon for adjusting the flux density of the core to different values, and means for automatically shunting an increasing proportion of the current from said direct current winding as the voltage applied thereto is decreased, said means also serving as an indicator of the electrical condition of the load.

10. The combination with a reactive device, of a controlling winding having a changeable current, and means for automatically shunting a considerable portion of the current from said winding when the value of the current supplied to the circuit of said winding is low and for shunting only a small portion of the current from said winding when the current supplied to the circuit of said winding is comparatively high, said means also serving as an indicator of the current supplied to said winding.

FRANK G. LOGAN.